United States Patent
Ligon

(10) Patent No.: US 8,049,960 B1
(45) Date of Patent: Nov. 1, 2011

(54) CONTRAST REAR PROJECTION SCREEN AND METHOD FOR MANUFACTURING THE SAME

(76) Inventor: Thomas R. Ligon, Loveland, CO (US)

( * ) Notice: Subject to any disclaimer, the term of this patent is extended or adjusted under 35 U.S.C. 154(b) by 1448 days.

(21) Appl. No.: 11/353,424

(22) Filed: Feb. 13, 2006

(51) Int. Cl.
*G03B 21/56* (2006.01)

(52) U.S. Cl. .................................................. 359/451

(58) Field of Classification Search .......... 359/451, 359/443, 452–453; 353/98, 122
See application file for complete search history.

(56) References Cited

U.S. PATENT DOCUMENTS

| | | | |
|---|---|---|---|
| 4,052,494 A | 10/1977 | Garrigan et al. | |
| 4,364,635 A * | 12/1982 | Stief | 359/451 |
| 5,897,980 A | 4/1999 | Phillips et al. | |
| 6,409,351 B1 | 6/2002 | Ligon | |
| 6,644,816 B1 * | 11/2003 | Perra et al. | 353/119 |
| 6,747,796 B1 | 6/2004 | Dorling | |
| 2002/0039229 A1 * | 4/2002 | Hirose et al. | 359/451 |
| 2003/0174396 A1 * | 9/2003 | Murayama et al. | 359/453 |
| 2008/0084542 A1 * | 4/2008 | Lalley et al. | 353/10 |

* cited by examiner

*Primary Examiner* — Christopher Mahoney
(74) *Attorney, Agent, or Firm* — Bert P. Krages, II

(57) ABSTRACT

A three-dimensional rear projection screen that has substantially improved contrast by using a tinted layer disposed between the source of the projected light and the light diffusion layer. This tinted attenuation layer diminishes the back-scattered light more than it diminishes the desired forward-scattered light which makes up the image on the screen. The contrast of the image is thus improved because the reduction of the back-scattered light relative to the forward-scattered light diminishes the degradation of contrast caused by the impingement of spurious light onto opposite portions of the rear projection screen.

17 Claims, 3 Drawing Sheets

CONTRAST REAR PROJECTION SCREEN AND METHOD FOR MANUFACTURING THE SAME

CROSS-REFERENCED TO RELATED APPLICATIONS

None

FEDERALLY SPONSORED RESEARCH

No

SEQUENCE LISTING OR PROGRAM

Not Applicable

BACKGROUND OF THE INVENTION

Rear projection is an arrangement in which the viewer sees an image on a screen, the image of which is provided by projecting light from behind the screen through means such as a source projector located behind the screen. The light from the source projector is thus directed toward the audience, and the screen material serves to scatter the light so that it appears to come from all points on the screen and not directly from the projector. When projecting onto a three-dimensional wrap-around screen, the image is formed on the surface of a translucent diffusion layer which may be bonded to a rigid transparent substrate. Rear projection screens are available in rigid and nonrigid configurations. Suitable materials for the substrate material used in rigid screens include acrylic, polyethylene terephthalate, and polycarbonate plastics, as well as glass.

The light scattered from the screen towards the viewer is referred to as forward-scattered light. However, with any rear screen material some portion of the light will also be scattered back in the direction towards the projector. This is referred to as back-scattered light. The back-scattered light contributes nothing to the image formed on the screen, and a good rear projection screen is designed to minimize this waste of light.

In the case of three-dimensional wrap-around screens, the back-scattered light creates an additional problem. For example, a spherical or cylindrical screen may have wrap-around projection provided by a source projector utilizing a simple fisheye lens, although other optical elements can be employed to provide wide-angle image distribution. The back-scattered light from one portion of the screen will impinge on opposite portions of the screen and degrade the desired image with spurious diffuse light. The result is a loss of contrast, where contrast is the ability to accurately reproduce and differentiate light and dark areas of an image. Ambient light can also pass through the viewing side of a wrap-around screen and impinge on the opposite portions and impair the ability of the screen to perform well under lighting conditions typical to audience areas in places such as museums, office lobbies, and visitor centers.

The image displayed on a screen by a source projector will always be limited in contrast because a fully black portion of the image will have some small illumination under the best of conditions due to the nature of the source projector technology. Nonetheless, the contrast of images transmitted by the source projector can be very high. For example, a fully lit portion of the image can be 1000 times brighter than a nominally-unilluminated portion of the image, providing a contrast ratio of 1000:1. If a source projector transmits an image onto a rear screen in a totally dark room, and 20 percent of the light is back-scattered on to other portions of the screen, the contrast on the screen could be degraded to a ratio of about 4:1, depending upon the distribution of light in the image. Ambient light contributed by rooms that are not totally dark will further reduce contrast by illuminating the screen image from the audience side as well as adding to the spurious light inside the screen.

Generally, three-dimensional rear projection screens encompass a thin rear screen material that is supported by a rigid transparent substrate such as clear acrylic. In practice, screen contrast is often improved by darkening the rear screen material with a neutral gray dye or pigment. In such arrangements, the forward-scattered light passes completely through the darkened film and is reduced in intensity by a certain amount while the back-scattered light has, on the average, passed through half of the film thickness, and is reduced by about half of the same amount (the differences being attributable to light scattering within the film). Therefore, this kind of arrangement still suffers significantly from a loss of contrast caused by the impingement of back-scattered light on opposite portions of the screen.

SUMMARY OF THE INVENTION

As noted above, wrap-around rear projection screens, including those of spherical, hemispherical, and cylindrical geometry, suffer a particular lost of contrast due to back scattering of the projected light falling on opposite portions of the screen and the projected image, thereby illuminating portions of the image with spurious light. The present invention substantially improves the contrast of such screens by using a tinted attenuation layer situated between the diffusion layer and the projection source. This tinted attenuation layer diminishes the back-scattered light more than it diminishes the desired forward-scattered light because the portion of the light energy which forms the back-scattered light must pass through the tinted attenuation layer three times before it enters the diffusion layer on the opposite portions of the rear projection screen. The contrast of the image is thus improved because the tinted attenuation layer diminishes the back-scattered light relative to the forward-scattered light and substantially reduces the degradation of the contrast caused by the impingement of spurious light onto the desired image.

A method for manufacturing the rear projection screen is also provided. Although there are several ways to position a tinted attenuation layer between the projection source and the diffusion layer so that back-scattered light must travel through the tinted attenuation layer three times before it can impinge on other parts of the rear projection screen, such arrangements do not always result in an optically-even distribution of the attenuating dye or pigment across the surface of the rear projection screen. While an optically-uneven attenuation layer will improve contrast, it will also cause the forward-scattered light to form an unevenly-illuminated image which will generally detract from the aesthetics of the projected image. For example, forming the substrate that supports the diffusion layer by vacuum forming or thermoforming a sheet of tinted acrylic into a three-dimensional shape such as a hemisphere, will produce a substrate in which the tint is unevenly distributed because the substrate will stretch unevenly across the sheet during the forming process. The dye or pigment in the formed acrylic substrate will thus be unevenly distributed and therefore unevenly attenuate the forward-scattered and back-scattered light. Likewise, it can be extremely difficult to achieve a uniform tint by spraying or brushing a transparent coating onto the curved surfaces inherent to the substrates used to fabricate three-dimensional screens.

A method to ensure that rear projection screens of a hemispherical or spherical shapes are manufactured in a manner in which the tinted attenuation layer has a uniform density is to apply a dye to the outer surface of the three-dimensional substrate after the substrate has been formed but before the diffusion layer is applied. Because dyes suitable for tinting acrylic substrates are expensive, it is also desirable to use a method of dyeing that minimizes the amount of dye needed to apply a tinted attenuation layer to the substrate. The method accomplishes both objectives by first forming the substrate into a substantially hemispherical shape by vacuum forming or thermoforming a sheet of acrylic or other thermoplastic material. The substrate is then placed over convex side down into a dye pot which has a similar but slightly larger shape than the substrate and secured so that a space exists between the outer surface of the substrate and the inside of the dye pot. Dye is then introduced into this space where it is constantly circulated by a pump. The entire assembly is then placed into a oven where it is heated to a temperature suitable for facilitating the penetration of the dye into the outer surface of the substrate. After the dye is given sufficient time to penetrate into substrate and achieve the desired optical density, the assembly is removed from the dye pot and rinsed off to prevent streaking by any residual dye. A vinyl diffusion layer is then applied to the outer surface of the substrate. In instances where a spherical configuration is desired, two hemispherical screens are fabricated as described above and joined together to form a sphere.

BRIEF DESCRIPTIONS OF THE DRAWINGS

DESCRIPTION OF THE PREFERRED EMBODIMENTS

Figure 1:
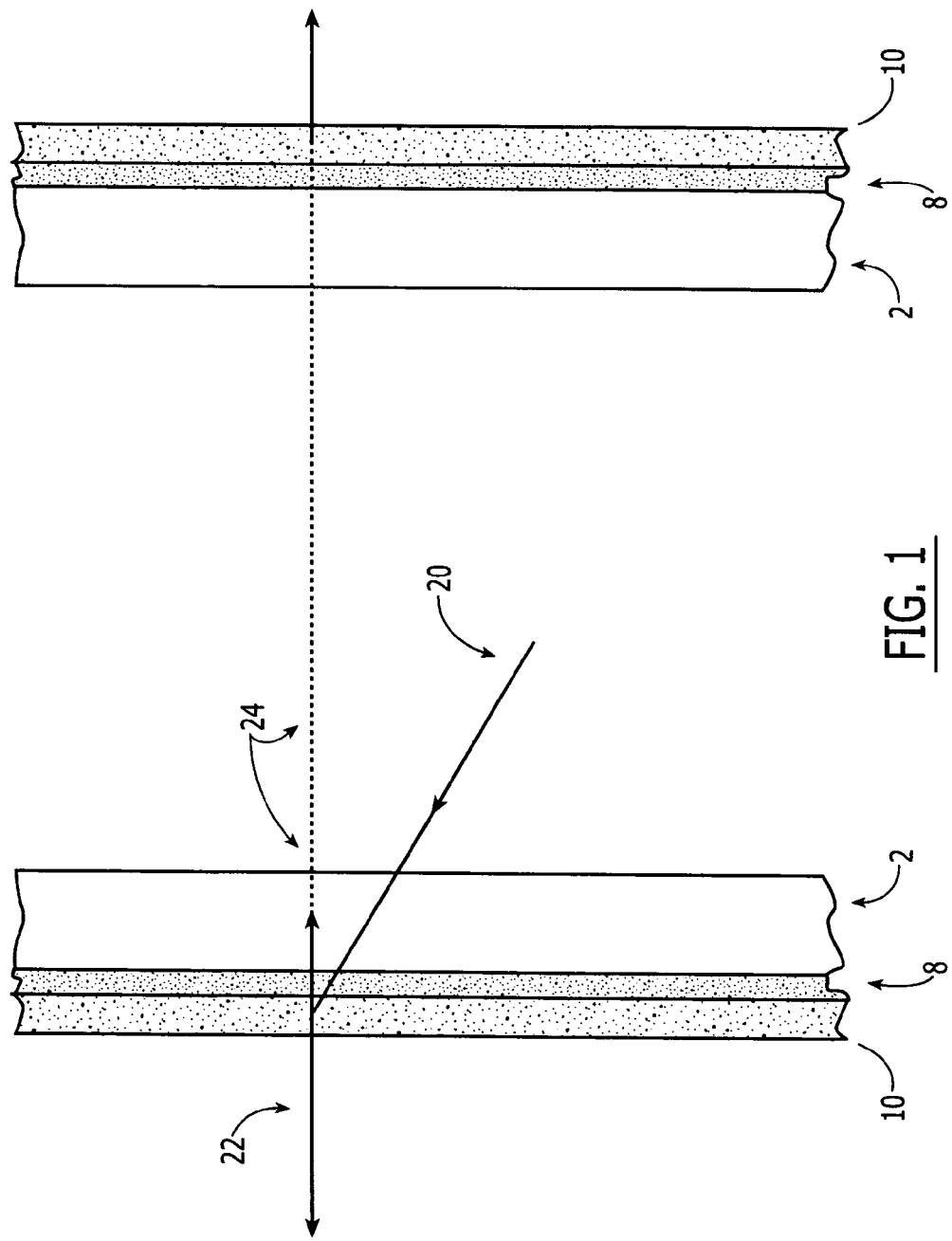
FIG. 1 is a sectional view illustrating how the projected light, forward-scattered light, and back-scattered light interact with the transparent shell, tinted attenuation layer, and diffusion layer

FIG. 1 illustrates the general principle upon which the tinted attenuation layer will enhance the contrast of the rear projection screen in a completely-darkened room. The figure is sectional view of a three-dimensional rear projection screen showing a tinted attenuation layer 8 disposed between a transparent substrate 2 and a diffusion layer 10. Because the screen has a three-dimensional form such as a sphere, cylinder, or cube, the figure shows opposing sides of the screen in which the transparent substrate 2 faces the source of the projected light and the diffusion layer faces the audience. The projected beam of light 20 is transmitted to the screen with an intensity represented by $I_S$ and is attenuated by the tinted attenuated layer 8 by a transmission factor represented by $T_T$. The fraction of light that is forward scattered by the diffusion layer 10 is represented by f and the fraction of light that is back scattered is represented by (1−f). The tinted filter layer 8 will attenuate the projected beam of light 20 without significant scattering. After attenuation, a portion the beam of light 20 forms a forward-scattered image 22 in the diffusion layer 10. The intensity of the forward scattered image 20 is represented by variable $I_F$ and by the equation:

$$I_F = fT_T I_S$$

The light that is back-scattered by the diffusion layer 10 is shown as back-scattered light 24 and represented by the variable $I_B$. The back-scattered light 24 is directed back through the tinted filter layer 8 where it is attenuated a second time. As the back-scattered light 24 emerges from the transparent substrate 2, its intensity is represented by the equation:

$$I_B = (1-f)T_T^2 I_S$$

The back-scattered light 24 is further transmitted to and impinges on the substrate 2 on the opposite side of the rear projection screen where it passes through the tinted filter layer 8 and is attenuated for a third time. The intensity of the back-scattered light 24 as it exits the diffusion layer 10 is represented by the equation:

$$I_B = f(1-f)T_T^3 I_S$$

Because the back-scattered light must pass through the tinted filter layer three times, while the forward-scattered light passes through the tinted filter layer only once, the back-scattered light 24 is more greatly attenuated than the forward-scattered light. The forward-scattered light 22 is the portion that forms the image and therefore the contrast is enhanced in the present invention because the enhanced attenuation experienced by the back-scattered light 24 greatly reduces the amount of spurious light that can degrade the image. The contrast of a rear projection screen with a tinted attenuation layer 8 is the ratio of the intensities forward-scattered light 22 to the back-scattered light 24 exiting the diffusion layer and is represented by the equation:

$$\text{Contrast} = [(1-f)T_T^2]^{-1}$$

The improvement of contrast of a rear projection screen with a tinted attenuation layer 8 compared to a rear projection screen without a tinted attenuation layer can be determined by calculating the ratio of the contrasts which can be represented by the equation:

$$\text{Contrast improvement} = T_T^2$$

It is noted that in the situation where a rear projection screen is installed in a room that is not completely dark, the tinted filter layer 8 will contribute to improving the overall contrast performance in external ambient light situations by absorbing some of the ambient light that is directed into the projection screen from external sources.

Figure 2:
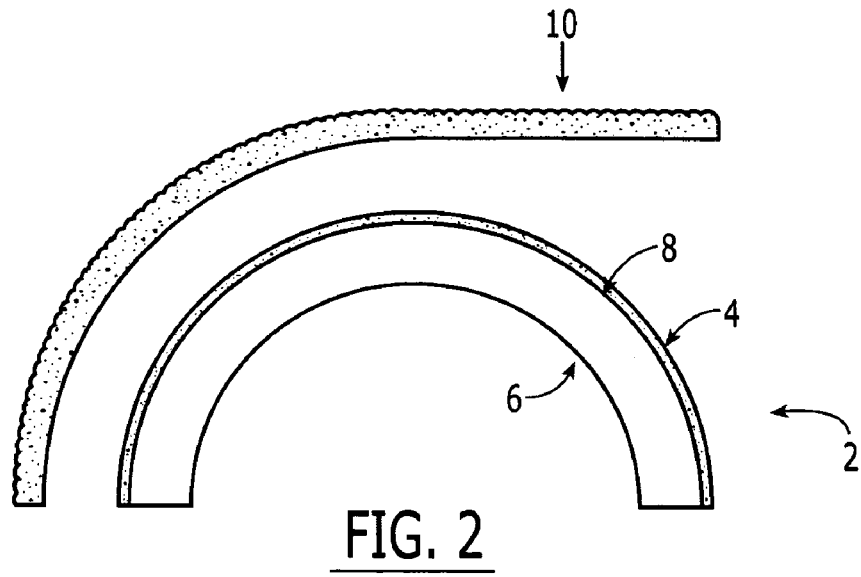
FIG. 2 is side elevation view in cross-section showing the tinted substrate in a hemisperical configuration prior to the bonding of a diffusion layer.

FIG. 2 depicts an exploded sectional view of the preferred embodiment of the invention which comprises a formed transparent acrylic shell 2 with an outer surface 4 and an inner surface 6. Said acrylic shell may be formed into a three-dimensional shape such as a hemisphere or cylinder through means well known in the art. Once the shell 2 has been shaped, it may be tinted by applying a dye to the outer surface 4. In the preferred embodiment, enough dye is applied to the outer surface 4 of the shell to form a tinted filter layer 8 that has a uniform neutral color and is sufficiently dense to attenuate the passage of light to about 70 percent transmission. However, attenuations in the range of 60 to 80 percent transmission will yield a good balance between the reduction of the intensity of the projected image relative to the improvement in contrast for most practical applications. After the dye is fixed onto the outer surface 4, a diffusion layer 10 in the form of a sheet of translucent projection film is bonded to the outer surface 4 of the shell 2 as shown in FIG. 3.

Figure 3:
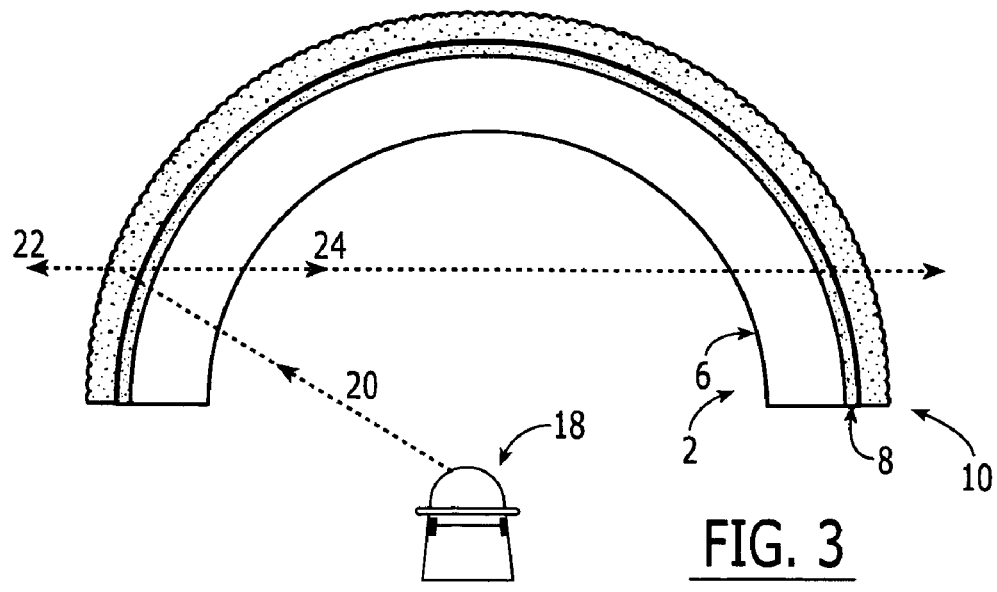
FIG. 3 is side elevation view in cross-section showing the tinted substrate in a hemispherical configuration to which a diffusion layer has been bonded.

FIG. 3 shows an unexploded section view of the preferred embodiment of the invention. Light can be projected onto the screen from a projection source inside the three-dimensional space within the shell 2. Several means of projecting light onto a three-dimensional screen are known in the art including projections through lens or onto mirrors. For illustrative purposes, FIG. 3 shows a fish-eye lens 18 as a source of projected light with an illustrative indication of the path of projected light 20, forward-scattered light 22, and back-scattered light 24 in the context of a hemispherical embodiment.

Figure 4:
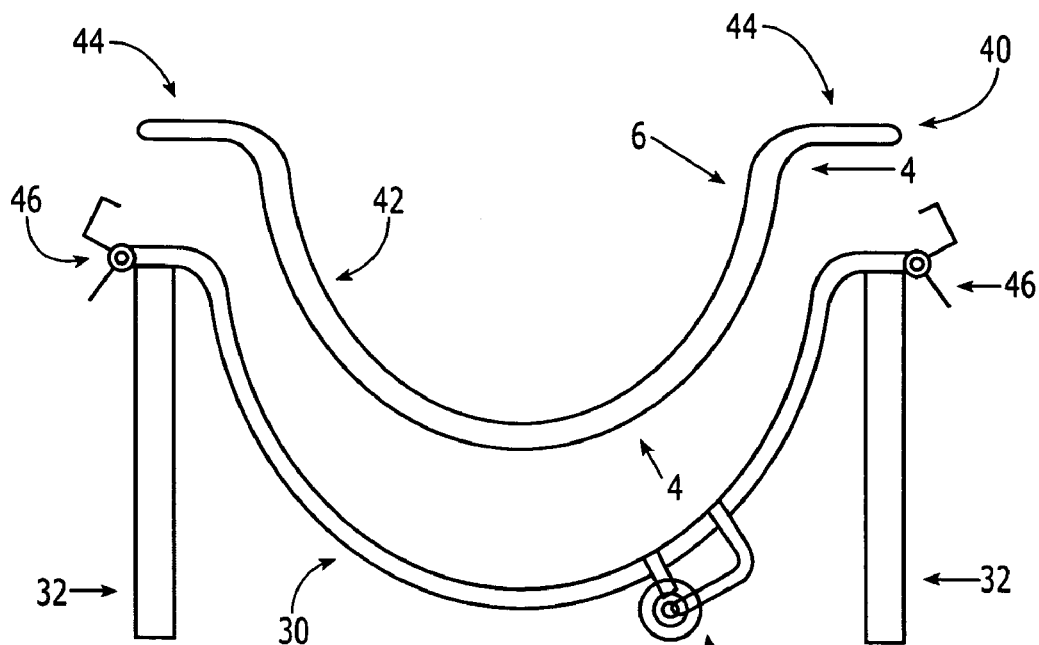
FIG. 4 is side elevation view in cross-section showing the dye pot and shell assembly.

The preferred embodiment of the method for manufacturing the present invention is illustrated as follows. FIG. 4 shows a dye pot 30 formed into the shape of a hemispherical bowl. The dye pot 30 is supported by legs 32 attached to outside of the dye pot. The dye pot 30 also comprises a small pump 36 which can be used to circulate and mix the dye 34 within the dye pot 30. Also shown is a shell assembly 40 comprising a hemispherical member 42 with a circumferential flange 44. The shell assembly is made from a thermoplastic material such as acrylic sheet and is formed into the hemispherical member 42 and circumferential flange 44 through means well known in the art.

Figure 5:
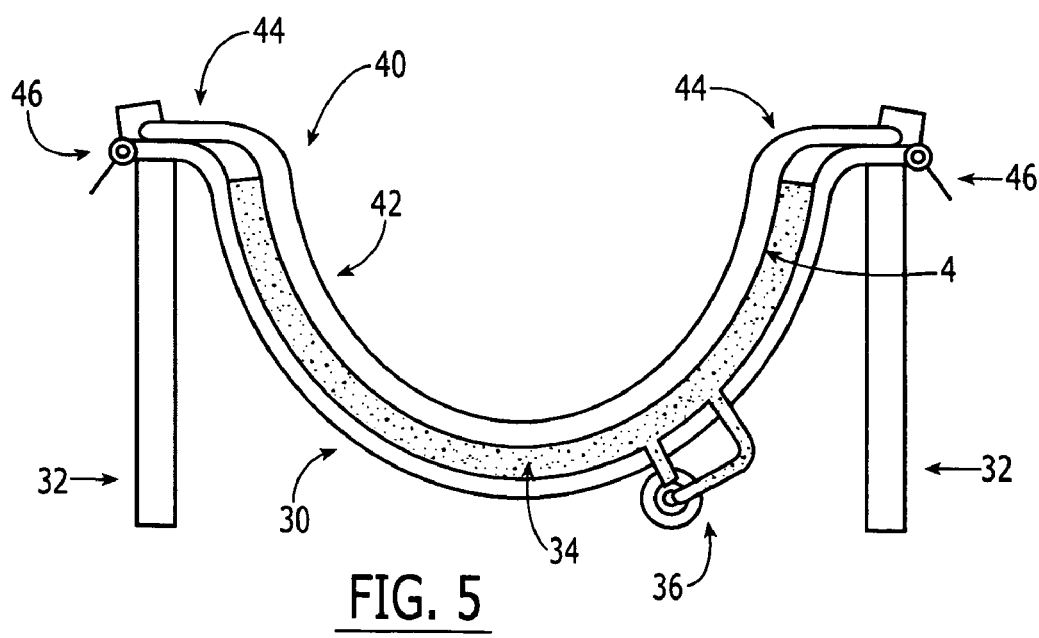
FIG. 5 is side elevation view in cross-section showing the shell assembly secured to the dye pot and with dye added into the space between them.

As shown in FIG. 5, the manufacturing method begins by placing the shell assembly 40 onto the dye pot 30 with the convex side 4 facing down and the circumferential flange 44 secured onto the rim of the dye pot 30 with clamps 46. The space between the hemispherical member 42 and the dye pot 30 is filled with dye solution 34 which is circulated within said space by a pump 36. The purpose of circulating the dye solution is to promote dyeing of an even density over the entire outer surface 4 of the hemispherical shell. Ideally, the space between the hemispherical member 42 and the dye pot 30 is sized to be large enough to permit effective circulation of the dye yet small enough to minimize the amount of dye solution 34 needed to effect the tinting of outer surface 4 to an effective optical density. Fabricating the dye pot 30 in a shape similar to but slightly larger than the hemispherical member 42 thus allows for more economical tinting by minimizing the amount of dye solution needed to cover the outer surface 4 during the dyeing process.

After the dye solution 34 has filled the space between the hemispherical member 42 and the dye pot, the entire assembly is then placed into an oven where it is heated to facilitate penetration of the dye into the hemispherical shell. The temperature setting and the amount of time that the hemispherical member and dye pot spend in the oven are determined by testing to ensure that an adequate optical density of the dye layer 8 shown in FIGS. 2 and 3 is obtained. After the assembly has spent the requisite amount of time in the oven, it is then removed from the oven and the hemispherical member is lifted from the dye pot and rinsed off with water to ensure that residual dye does not cause streaking.

After dyeing, the translucent projection screen material 10 is applied to the outer surface of the hemispherical member 42 and bonded thereto. The circumferential flange 44 is cut off and the edge is machined. If it is desired to create a spherical rear projection screen, two hemispherical assemblies may be manufactured and joined together. In addition to rear projection screens, the method of dyeing could be applied to other projection applications such as earth-sky projectors used in simulators.

There are various other possible arrangements of elements or method steps that one skilled in the art could substitute and obtain similar results as achieved herein. All these possibilities are within the scope and spirit of this disclosure.

I claim:

1. A rear projection screen which encloses a three-dimensional space comprising:
   said screen having a first side and an opposing side, onto which an optical image is projected by a light emanating from at least one light projection source;
   said rear projection screen comprising a tinted attenuation layer and a light diffusion layer;
   wherein said tinted attenuation layer is disposed between said light projection source and said light diffusion layer so as to attenuate back-scattered light from said light diffusion layer a first time when said back-scattered light is back scattered from said diffusion layer on said first side and a second time before said back-scattered light enters said diffusion layer on said opposing side; and
   further wherein there is no second diffusion layer between said tinted attenuation layer on said first side and on said opposing side.

2. The rear projection screen of claim 1 in which said tinted attenuation layer constitutes a tinted transparent substrate that supports said light diffusion layer.

3. The rear projection screen of claim 1 in which said three-dimensional space is substantially spherical.

4. The rear projection screen of claim 1 in which said three-dimensional space is substantially hemispherical.

5. The rear projection screen of claim 1 in which said three-dimensional space is substantially cylindrical.

6. The rear projection screen of claim 1 in which said light projection source is located within said three-dimensional space.

7. A rear projection screen which encloses a three-dimensional space onto which an optical image is projected by a light emanating from at least one light projection source, said rear projection screen comprising a substrate that supports a tinted attenuation layer having an optically-even distribution of tint and a light diffusion layer wherein said attenuation layer is disposed between said light projection source and said light diffusion layer.

8. The rear projection screen of claim 7 in which said three-dimensional space is substantially spherical and said substrate has been formed by vacuum forming or thermoforming.

9. The rear projection screen of claim 7 in which said three-dimensional space is substantially hemispherical and said substrate has been formed by vacuum forming or thermoforming.

10. The rear projection screen of claim 7 in which said three-dimensional space is substantially cylindrical.

11. The rear projection screen of claim 7 in which said tinted attenuation layer comprises a dye applied to a surface of said substrate and said substrate is clear and transparent.

12. The rear projection screen of claim 7 in which said tinted attenuation layer comprises a dye applied to a surface of said substrate, said substrate is clear and transparent, and in which said three-dimensional space is substantially spherical.

13. The rear projection screen of claim 7 in which said tinted attenuation layer comprises a dye applied to a surface of said substrate, said substrate is clear and transparent, and in which said three-dimensional space is substantially hemispherical.

14. The rear projection screen of claim 7 in which said tinted attenuation layer comprises a dye applied to a surface of said substrate, said substrate is clear and transparent, and in which said three-dimensional space is substantially cylindrical.

15. The rear projection screen of claim 7 in which said tinted attenuation layer has an optical density which reduces the one-way transmission of light by 20 percent or more.

16. The rear projection screen of claim 7 in which said light projection source is located within said three-dimensional space.

17. The rear projection screen of claim 7 in which said tinted attenuation layer is a dye distributed throughout said substrate.

* * * * *